United States Patent
Ohmori et al.

(10) Patent No.: US 11,145,887 B2
(45) Date of Patent: Oct. 12, 2021

(54) FUEL CELL STACK

(71) Applicant: HONDA MOTOR CO., LTD., Tokyo (JP)

(72) Inventors: Suguru Ohmori, Wako (JP); Kensuke Umezawa, Wako (JP); Hiroshi Morikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/519,031

(22) Filed: Jul. 23, 2019

(65) Prior Publication Data

US 2020/0036031 A1 Jan. 30, 2020

(30) Foreign Application Priority Data

Jul. 26, 2018 (JP) .............................. JP2018-139906

(51) Int. Cl.
*H01M 8/248* (2016.01)
*H01M 8/0273* (2016.01)
(Continued)

(52) U.S. Cl.
CPC ......... *H01M 8/248* (2013.01); *H01M 8/0202* (2013.01); *H01M 8/0258* (2013.01); *H01M 8/0273* (2013.01); *H01M 8/0276* (2013.01); *H01M 8/247* (2013.01); *H01M 8/2475* (2013.01); *B60L 50/71* (2019.02); *B60L 50/72* (2019.02); *B60Y 2400/202* (2013.01);
(Continued)

(58) Field of Classification Search
CPC .. H01M 8/2475; H01M 8/248; H01M 8/2484; H01M 2250/20; H01M 8/04014; H01M 8/2465; H01M 8/04029; H01M 8/0273; H01M 8/0258; H01M 8/0276; H01M 8/0202; H01M 8/247; Y02T 90/40; B60Y 2400/202; B60L 50/71; B60L 50/72; Y02E 60/50
See application file for complete search history.

(56) References Cited

U.S. PATENT DOCUMENTS

| 2004/0142228 A1* | 7/2004 | Komura | H01M 8/242 |
| | | | 429/454 |
| 2006/0110650 A1* | 5/2006 | Sugiura | H01M 8/04291 |
| | | | 429/457 |

(Continued)

FOREIGN PATENT DOCUMENTS

| JP | 2005-243286 | 9/2005 |
| JP | 2008-04308 | 1/2008 |

(Continued)

*Primary Examiner* — Milton I Cano
*Assistant Examiner* — Philip A. Stuckey
(74) *Attorney, Agent, or Firm* — Amin, Turocy & Watson, LLP (57) ABSTRACT

A fuel cell stack includes a cell stack body and a terminal plate and an insulator disposed at an end of the cell stack body in a stacking direction. The cell stack body includes a plurality of stacked power generation cells. Each of the power generation cells includes a membrane electrode assembly and a separator. The terminal plate is disposed between the cell stack body and the insulator. Elastic structure which elastically presses the terminal plate toward the cell stack body is provided between the insulator and the terminal plate.

11 Claims, 7 Drawing Sheets

(51) Int. Cl.
*H01M 8/247* (2016.01)
*H01M 8/0202* (2016.01)
*H01M 8/0276* (2016.01)
*H01M 8/2475* (2016.01)
*H01M 8/0258* (2016.01)
*B60L 50/72* (2019.01)
*B60L 50/71* (2019.01)

(52) U.S. Cl.
CPC .......... *H01M 2250/20* (2013.01); *Y02E 60/50* (2013.01); *Y02T 90/40* (2013.01)

(56) References Cited

U.S. PATENT DOCUMENTS

| | | | |
|---|---|---|---|
| 2009/0317688 A1 | 12/2009 | Inagaki | |
| 2013/0260275 A1* | 10/2013 | Ichihara | H01M 8/2485 |
| | | | 429/458 |
| 2017/0092970 A1* | 3/2017 | Saiki | H01M 8/247 |
| 2018/0040907 A1* | 2/2018 | Ishida | H01M 8/0276 |

FOREIGN PATENT DOCUMENTS

| | | |
|---|---|---|
| JP | 2008-066178 | 3/2008 |
| JP | 2008-108485 | 5/2008 |

* cited by examiner

FUEL CELL STACK

CROSS-REFERENCE TO RELATED APPLICATION

This application is based upon and claims the benefit of priority from Japanese Patent Application No. 2018-139906 filed on Jul. 26, 2018, the contents of which are incorporated herein by reference.

BACKGROUND OF THE INVENTION

Field of the Invention

The present invention relates to a fuel cell stack including a cell stack body formed by stacking a plurality of power generation cells and a terminal plate and an insulator provided at an end of the cell stack body.

Description of the Related Art

For example, a solid polymer electrolyte fuel cell employs a membrane electrode assembly (MEA) formed by providing an anode on one surface of an electrolyte membrane, and a cathode on the other surface of the electrolyte membrane. The electrolyte membrane is a polymer ion exchange membrane. The membrane electrode assembly is sandwiched between separators to form a power generation cell. Generally, a predetermined number of power generation cells are stacked together in a stacking direction, and a tightening load is applied to the power generation cells in the stacking direction to form a fuel cell stack. The fuel cell stack is mounted as an in-vehicle fuel cell stack, in a fuel cell vehicle.

Japanese Laid-Open Patent Publication No. 2005-243286 discloses structure where a terminal plate and an insulating spacer are provided between a cell stack body formed by a plurality of power generation cells and an end plate.

SUMMARY OF THE INVENTION

In order to obtain the desired power generation performance in a fuel cell stack, it is required to apply a predetermined tightening load to a cell stack body in a stacking direction. If the tightening load changes due to the size tolerance of the component parts of the cell stack body, temperature changes, gas pressure changes, creeps in the component parts, the power generation performance may be degraded undesirably.

An object of the present invention is to provide a fuel cell stack in which it is possible to absorb size changes in a stacking direction, of an electrode part of a membrane electrode assembly in a cell stack body, and effectively suppress load changes in the electrode part.

In order to achieve the above object, according to an aspect of the present invention, a fuel cell stack is provided, and includes a cell stack body including a plurality of stacked power generation cells, the power generation cells each including a membrane electrode assembly and a separator, and a terminal plate and an insulator disposed at an end of the cell stack body in a stacking direction, wherein the terminal plate is disposed between the cell stack body and the insulator, and a load in the stacking direction is applied to the cell stack body, the terminal plate, and the insulator, and wherein elastic structure configured to elastically press the terminal plate toward the cell stack body is provided between the insulator and the terminal plate.

In the fuel cell stack, the elastic structure is provided between the insulator and the terminal plate. Therefore, it become possible to absorb size changes in the stacking direction, of the electrode part (electrode reaction surface) of membrane electrode assembly in the cell stack body, and effectively suppress load changes in the electrode part.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

In the following description, the "upper direction (upper part (position))" means the "upper direction (upper part (position))" in the vertical direction. A fuel cell vehicle 11 shown in FIG. 1 includes a fuel cell system 10. For example, the fuel cell vehicle 11 is a fuel cell electric automobile. The fuel cell system 10 includes a fuel cell stack 12. The fuel cell stack 12 is provided in a front room (motor room) 18 formed on the front side of a dash board 16 (in a direction indicated by an arrow Af). The fuel cell stack 12 includes a cell stack body 12st formed by stacking a plurality of power generation cells 12c in a vehicle width direction (indicated by an arrow B), and a stack case 13 covering the cell stack body 12st.

Figure 2:
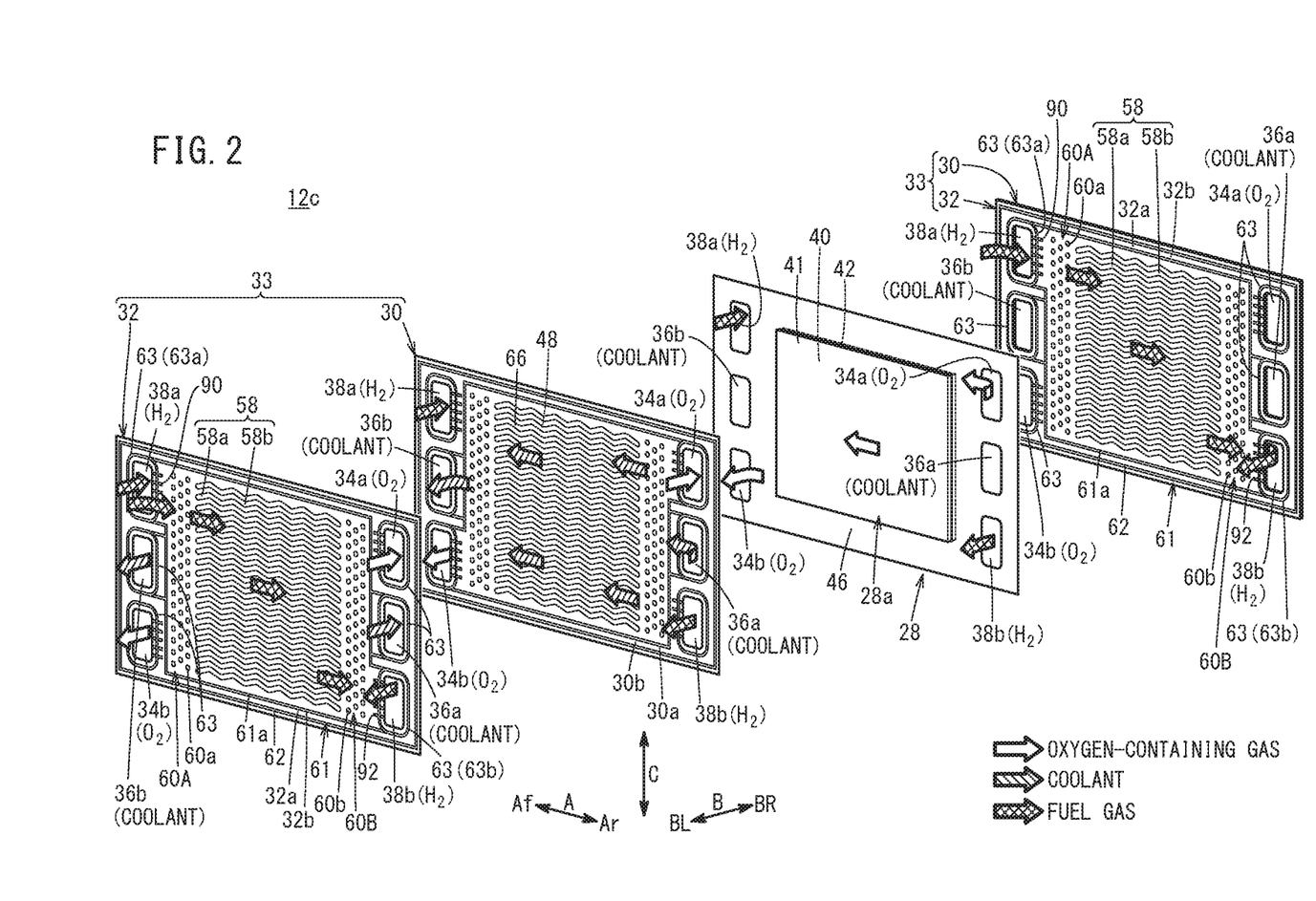
FIG. 2 is an exploded perspective view showing a power generation cell.

As shown in FIG. 2, the power generation cell 12c includes a resin film equipped MEA 28, a first metal separator 30 provided on one surface of the resin film equipped MEA 28, and a second metal separator 32 provided on the other surface of the resin film equipped MEA 28. The first metal separator 30 is an example of a separator. The second metal separator 32 is an example of a separator. For example, a plurality of power generation cells 12c are stacked together in a direction indicated by an arrow B (horizontal direction) or in a direction indicated by an arrow C (gravity direction). A tightening load (compression load) in a stacking direction is applied to the power generation cells 12c to form the fuel cell stack 12.

Each of the first metal separator 30 and the second metal separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Outer ends of the first metal separator 30 of one of the adjacent power generation cells 12c and the second metal separator 32 of the other of the adjacent power generation cells 12c are joined together by welding, brazing, crimpling, etc. to form a joint separator 33.

At one end of the power generation cell 12c in a horizontal direction (long side direction) (an end indicated by an arrow Ar), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12c in the stacking direction indicated by an arrow A. The oxygen-containing gas supply passage 34a, the coolant supply passage 36a, and the fuel gas discharge passage 38b are arranged in the vertical direction indicated by an arrow C. For example, an oxygen-containing gas is supplied through an oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12c in the horizontal direction (long side direction) (an end indicated by an arrow Af), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12c in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b is not limited to the above embodiment, and may be determined as necessary depending on the required specification.

The resin film equipped MEA 28 includes a membrane electrode assembly 28a, and a frame shaped resin film 46 provided on an outer peripheral portion of the membrane electrode assembly 28a. The membrane electrode assembly 28a includes an electrolyte membrane 40, and a cathode 41 and an anode 42 on both sides of the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the cathode 41 and the anode 42. A fluorine based electrolyte may be used as the electrolyte membrane 40. Alternatively, an HC (hydrocarbon) based electrolyte may be used as the electrolyte membrane 40.

The cathode 41 includes a first electrode catalyst layer joined to one surface of the electrolyte membrane 40, and a first gas diffusion layer stacked on the first electrode catalyst layer. The anode 42 includes a second electrode catalyst layer joined to the other surface of the electrolyte membrane 40, and a second gas diffusion layer stacked on the second electrode catalyst layer.

At an end of the resin film 46 in the direction indicated by the arrow Ar, the oxygen-containing gas supply passage 34a, the coolant supply passage 36a, and the fuel gas discharge passage 38b are provided. At an end of the resin film 46 in the direction indicated by the arrow Af, the fuel gas supply passage 38a, the coolant discharge passage 36b, and the oxygen-containing gas discharge passage 34b are provided.

Figure 3:
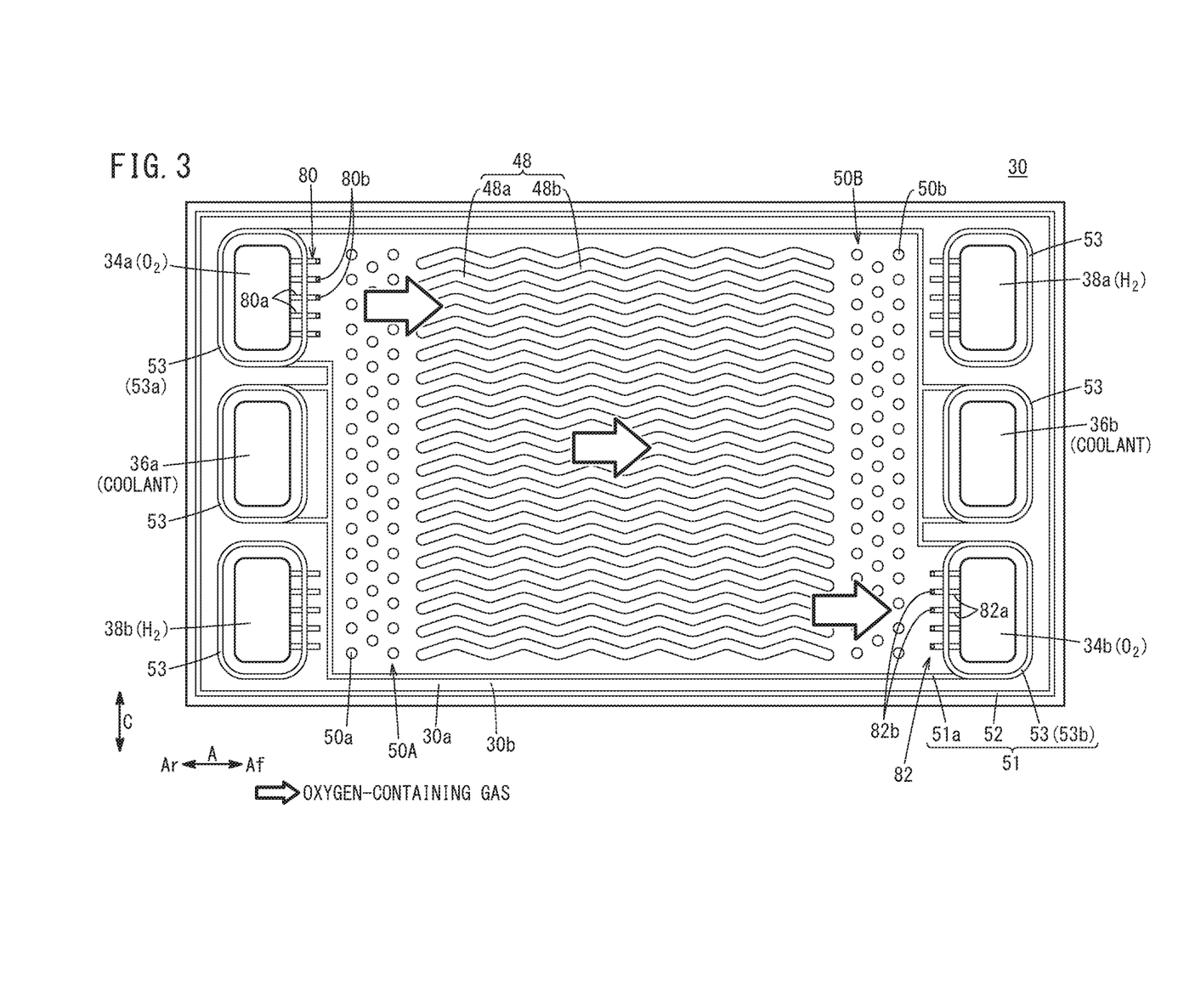
FIG. 3 is a view showing a first metal separator as viewed from a side where an oxygen-containing gas flow field is present.

As shown in FIG. 3, the first metal separator 30 has an oxygen-containing gas flow field 48 on its surface 30a facing the resin film equipped MEA 28 (hereinafter referred to as the "surface 30a"). For example, the oxygen-containing gas flow field 48 extends in the direction indicated by the arrow A. The oxygen-containing gas flow field 48 is connected to (in fluid communication with) the oxygen-containing gas supply passage 34a and the oxygen-containing gas discharge passage 34b. The oxygen-containing gas flow field 48 includes a plurality of flow grooves 48b formed between a plurality of flow field forming ridges 48a extending in the direction indicated by the arrow A. The flow field forming ridges 48a are formed by press forming, and expanded toward the resin film equipped MEA 28. In the illustrated embodiment, the flow grooves 48b have a wavy shape extending in the direction indicated by the arrow A. The flow grooves 48b may be straight grooves extending in the direction indicated by the arrow A.

An inlet buffer 50A is provided on the surface 30a of the first metal separator 30, between the oxygen-containing gas supply passage 34a and the oxygen-containing gas flow field 48. A plurality of bosses 50a are formed in the inlet buffer 50A. An outlet buffer 50B is provided on the surface 30a of the first metal separator 30, between the oxygen-containing gas discharge passage 34b and the oxygen-containing gas flow field 48. A plurality of bosses 50b are formed in the outlet buffer 50B. The bosses 50a, 50b have a circular shape in a plan view (viewed in the stacking direction). Alternatively, the bosses 50a, 50b may have an oval shape or a linear shape in a plan view (viewed in the stacking direction).

A first seal line 51 is formed by press forming on the surface 30a of the first metal separator 30. The first seal line 51 is expanded toward the resin film equipped MEA 28 (FIG. 2). The first seal line 51 is an example of a seal. Resin material may be fixed to protruding front surfaces of the first seal line 51 by printing, coating, etc. For example, polyester fiber is used as the resin material. The resin material may be provided on the part of the resin film 46.

The first seal line 51 includes a bead seal 51a (hereinafter referred to as the "inner bead 51a") provided around the oxygen-containing gas flow field 48, the inlet buffer 50A, and the outlet buffer 50B), a bead seal 52 (hereinafter referred to as the "outer bead 52") provided outside the inner bead 51a along the outer periphery of the first metal separator 30, and a plurality of bead seals 53 (hereinafter referred to as the "passage beads 53") provided around the plurality of fluid passages (oxygen-containing gas supply passage 34a, etc.), respectively. The outer bead 52 protrudes from the surface 30a of the first metal separator 30 toward the resin film equipped MEA 28, and the outer bead 52 is provided along the outer marginal portion of the surface 30a of the first metal separator 30. Instead of the bead seal, an elastic rubber seal may be used as the first seal line 51.

The plurality of passage beads 53 protrude from the surface 30a of the first metal separator 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 53, the passage bead formed around the oxygen-containing gas supply passage 34a will be referred to as a "passage bead 53a", and the passage bead formed around the oxygen-containing gas discharge passage 34b will be referred to as a "passage bead 53b". The above described inlet buffer 50A (having the plurality of bosses 50a) is provided between the passage bead 53a and the oxygen-containing gas flow field 48. The above described outlet buffer 50B (having the plurality of bosses 50b) is provided between the passage bead 53b and the oxygen-containing gas flow field 48. The first metal separator 30 has bridge sections 80, 82 connecting the inside (adjacent to fluid passages 34a, 34b) and the outside (adjacent to the oxygen-containing gas flow field 48) of the passage beads 53a, 53b.

The bridge section 80 is provided in the passage bead 53a around the oxygen-containing gas supply passage 34a. The bridge section 80 includes a plurality of tunnels 80a provided at intervals. The tunnels 80a are formed by press forming, and protrude toward the resin film equipped MEA 28 (FIG. 2) in a manner that the tunnels 80a intersect with the passage bead 53a. One end of each of the tunnels 80a is opened to the oxygen-containing gas supply passage 34a. The other end of each of the tunnels 80a has an opening 80b. Therefore, the oxygen-containing gas supply passage 34a and the oxygen-containing gas flow field 48 are connected together through the bridge section 80.

The bridge section 82 is provided in the passage bead 53b around the oxygen-containing gas discharge passage 34b. The bridge section 82 includes a plurality of tunnels 82a provided at intervals. The tunnels 82a are formed by press forming, and protrude toward the resin film equipped MEA 28 (FIG. 2) in a manner that the tunnels 82a intersect with the passage bead 53b. One end of each of the tunnels 82a is opened to the oxygen-containing gas discharge passage 34b. The other end of each of the tunnels 82a has an opening 82b. Therefore, the oxygen-containing gas discharge passage 34b and the oxygen-containing gas flow field 48 are connected together through the bridge section 82.

Figure 4:
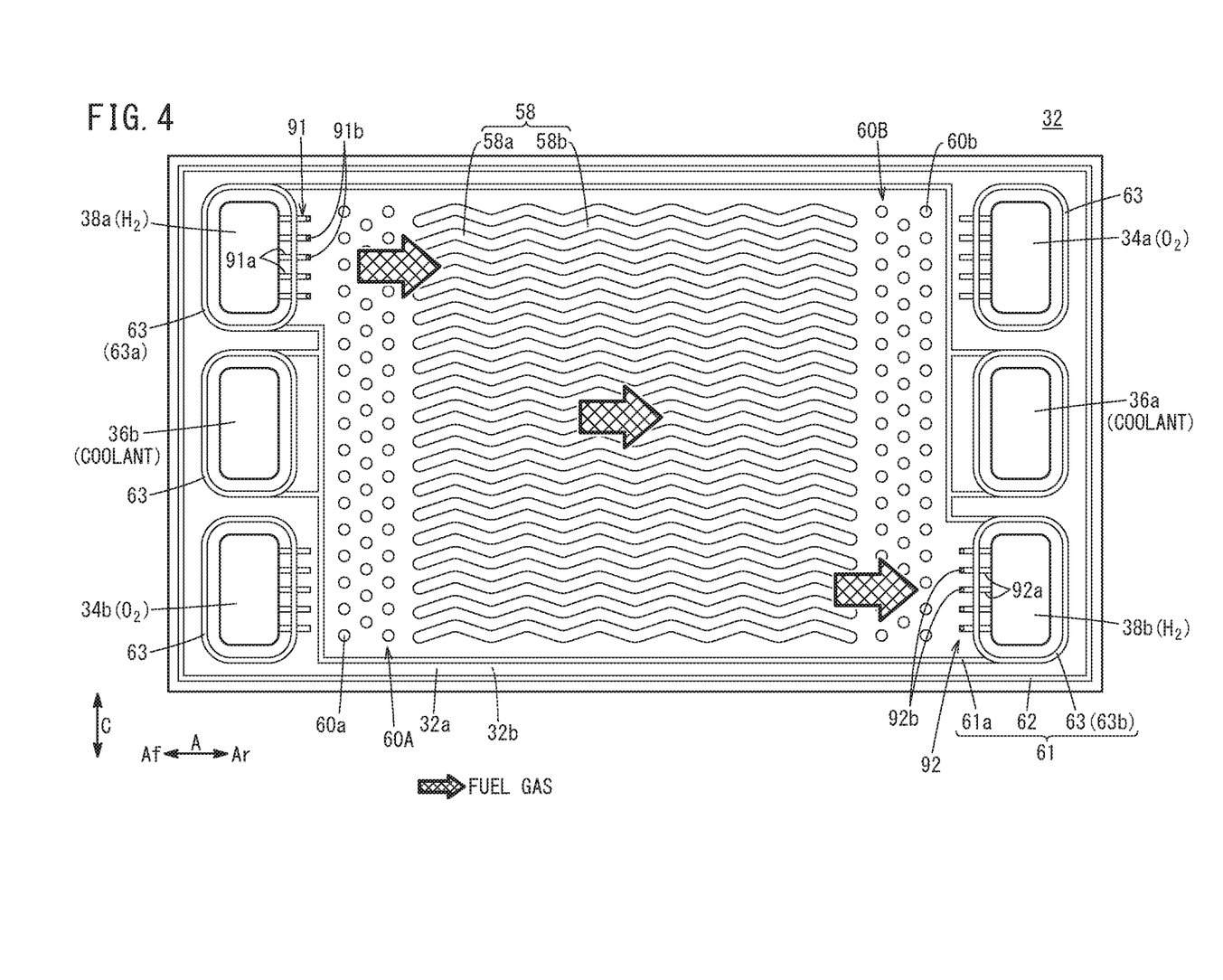
FIG. 4 is a view showing a second metal separator as viewed from a side where a fuel gas flow field is present.

As shown in FIG. 4, the second metal separator 32 has a fuel gas flow field 58 on its surface 32a facing the resin film equipped MEA 28 (hereinafter referred to as the "surface 32a"). For example, the fuel gas flow field 58 extends in the direction indicated by the arrow A. The fuel gas flow field 58 is connected to (in fluid communication with) the fuel gas supply passage 38a and the fuel gas discharge passage 38b. The fuel gas flow field 58 includes a plurality of flow grooves 58b formed between a plurality of flow field forming ridges 58a extending in the direction indicated by the arrow A. The flow field forming ridges 58a are formed by press forming, and expanded toward the resin film equipped MEA 28. In the illustrated embodiment, the flow grooves 58b have a wavy shape extending in the direction indicated by the arrow A. The flow grooves 58b may be straight grooves extending in the direction indicated by the arrow A.

An inlet buffer 60A is provided on the surface 32a of the second metal separator 32, between the fuel gas supply passage 38a and the fuel gas flow field 58. A plurality of bosses 60a are formed in the inlet buffer 60A. An outlet buffer 60B is provided on the surface 32a of the second metal separator 32, between the fuel gas discharge passage 38b and the fuel gas flow field 58. A plurality of bosses 60b are formed in the outlet buffer 60B. The bosses 60a, 60b have a circular shape in a plan view (viewed in the stacking direction). Alternatively, the bosses 60a, 60b may have an oval shape or a linear shape in a plan view (viewed in the stacking direction).

A second seal line 61 is formed by press forming on the surface 32a of the second metal separator 32. The second seal line 61 is expanded toward the resin film equipped MEA 28 (FIG. 2). The second seal line 61 is an example of a seal. Resin material may be fixed to protruding front surfaces of the second seal line 61 by printing, coating, etc. For example, polyester fiber is used as the resin material. The resin material may be provided on the part of the resin film 46.

The second seal line 61 includes a bead seal (hereinafter referred to as an "inner bead 61a") provided around the fuel gas flow field 58, the inlet buffer 60A, and the outlet buffer 60B), a bead seal (hereinafter referred to as an "outer bead 62") provided outside the inner bead 61a along the outer periphery of the second metal separator 32, and a plurality of bead seals (hereinafter referred to as a "passage beads 63") provided around the plurality of fluid passages (fluid passage 38a, etc.), respectively. The outer bead 62 protrudes from the surface 32a of the second metal separator 32, and the outer bead 62 is provided along the outer marginal portion of the surface 32a of the second metal separator 32. Instead of the bead seal, an elastic rubber seal may be used as the second seal line 61.

The plurality of passage beads 63 protrude from the surface 32a of the second metal separator 32. The passage beads 63 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 63, the passage bead formed around the fuel gas supply passage 38a will be referred to as a "passage beads 63a", and the passage bead formed around the fuel gas discharge passage 38b will be referred to as a "passage beads 63b". The above described inlet buffer 60A (having the plurality of bosses 60a) is provided between the passage bead 63a and the fuel gas flow field 58. The above described outlet buffer 60B (having the plurality of bosses 60b) is provided between the passage bead 63b and the fuel gas flow field 58. The second metal separator 32 has bridge sections 91, 92 connecting the inside (adjacent to the fluid passages 38a, 38b) and the outside (adjacent to the fuel gas flow field 58) of the passage beads 63a, 63b.

The bridge section 91 is provided in the passage bead 63a around the fuel gas supply passage 38a. The bridge section 91 includes a plurality of tunnels 91a provided at intervals. The tunnels 91a are formed by press forming, and protrude toward the resin film equipped MEA 28 (FIG. 2) in a manner that the tunnels 91a intersect with the passage bead 63a. One end of each of the tunnels 91a is opened to the fuel gas supply passage 38a. The other end of each of the tunnels 91a has an opening 91b. Therefore, the fuel gas supply passage 38a and the fuel gas flow field 58 are connected together through the bridge section 91.

The bridge section 92 is provided in the passage bead 63b around the fuel gas discharge passage 38b. The bridge section 92 includes a plurality of tunnels 92a provided at intervals. The tunnels 92a are formed by press forming, and protrude toward the resin film equipped MEA 28 (FIG. 2) in a manner that the tunnels 92a intersect with the passage bead 63b. One end of each of the tunnels 92a is opened to the fuel gas discharge passage 38b. The other end of each of the tunnels 92a has an opening 92b. Therefore, the fuel gas discharge passage 38b and the fuel gas flow field 58 are connected together through the bridge section 92.

As shown FIG. 2, a coolant flow field 66 connected to (in fluid communication with) the coolant supply passage 36a and the coolant discharge passage 36b is formed between a surface 30b of the first metal separator 30 and a surface 32b of the second metal separator 32 that are joined together. The coolant flow field 66 is formed between the back surface of the oxygen-containing gas flow field 48 of the first metal separator 30 and the back surface of the fuel gas flow field 58 of the second metal separator 32, when the first metal separator 30 and the second metal separator 32 stacked together.

Figure 1:
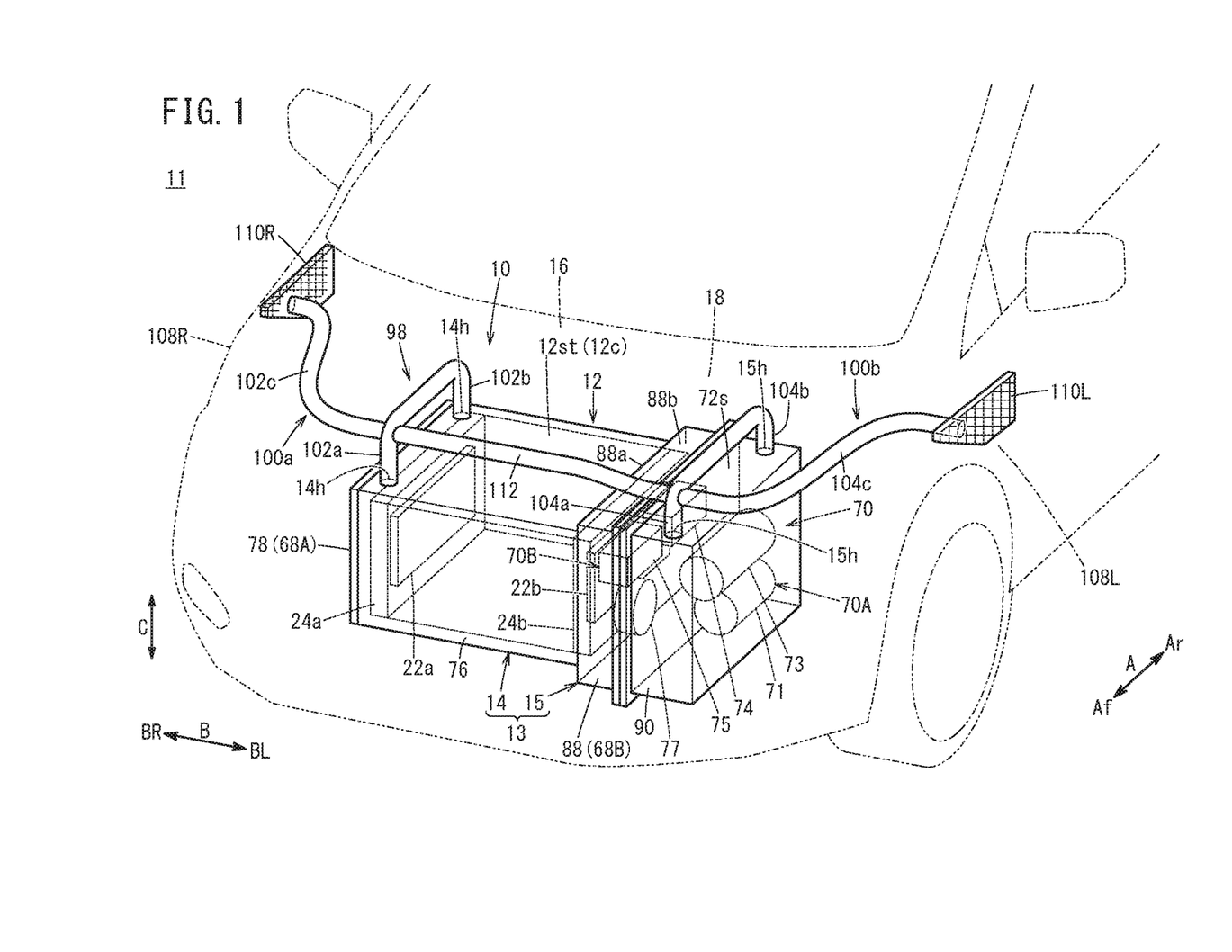
FIG. 1 is a perspective view showing a fuel cell vehicle including a fuel cell stack according to an embodiment of the present invention.

As shown in FIG. 1, at one end of the cell stack body 12st in the stacking direction (indicated by an arrow BR), a terminal plate 22a is provided. An insulator 24a is provided outside the terminal plate 22a. At the other end of the cell stack body 12st in the stacking direction (indicated by an arrow BL), a terminal plate 22b is provided. An insulator 24b is provided outside the terminal plate 22b. A tightening load in the stacking direction (indicated by the arrow B) is applied to the cell stack body 12st by the stack case 13. The terminal plates 22a, 22b are made of electrically conductive material, such as copper, aluminum, or metal chiefly containing these materials.

The stack case 13 includes a main case 14 containing the cell stack body 12st, and an auxiliary device case 15 containing fuel cell auxiliary devices 70. The stack case 13 has a substantially rectangular parallelepiped shape (rectangular parallelepiped shape having long sides extending in the vehicle width direction).

Figure 5:
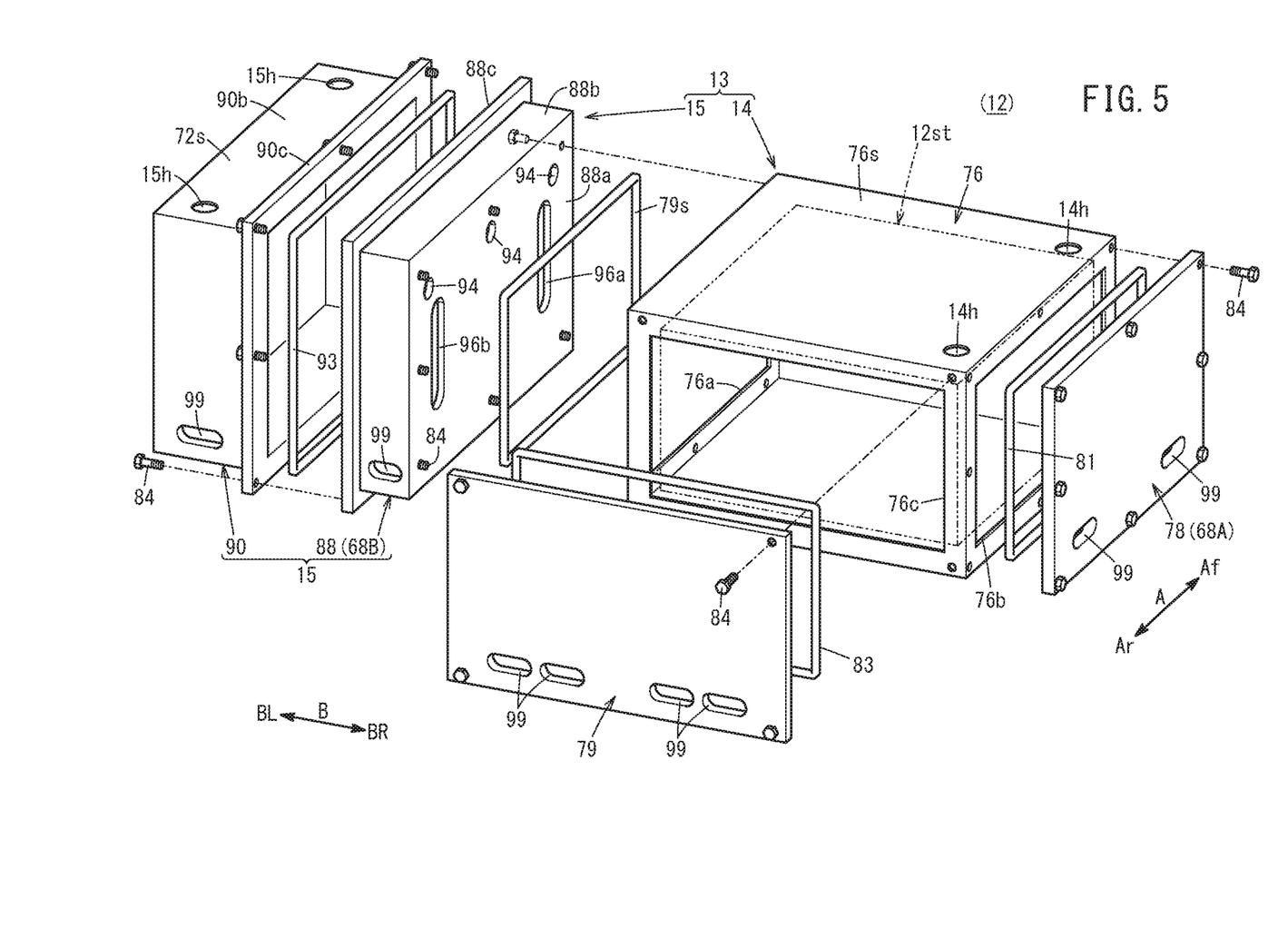
FIG. 5 is an exploded perspective view showing a stack case.

As shown in FIG. 5, the main case 14 includes a case body 76 having a rectangular shape in a plan view. The case body 76 includes a rectangular left opening 76a formed on the left side (in the direction indicated by the arrow BL), a rectangular right opening 76b formed on the right side (in the direction indicated by the arrow BR), and a rectangular rear opening 76c formed on the rear side (in the direction indicated by the arrow Ar). The main case 14 has a box shape.

Holes 14h are formed at two corners of the upper part of the case body 76 (in the illustrated embodiment, an upper surface 76s of the case body 76 in the vertical direction), opposite to the side joined to the auxiliary device case 15. The main case 14 is in fluid communication with the outside through the holes 14h. The hole 14h may be formed at only one of the two corners of the case body 76. The holes 14h may be formed on the upper part of the side surfaces, instead of the upper surface 76s of the main case 14 in the vertical direction.

Further, the main case 14 includes a right side panel 78 which closes the right opening 76b of the case body 76, and a rear side panel 79 which closes a rear opening 76c of the case body 76. The right side panel 78 is a rectangular panel. The right side panel 78 is joined to a right end of the case body 76 using bolts 84. The right side panel 78 also serves as an end plate 68A on one side for applying a tightening load in the stacking direction to the cell stack body 12st. A seal member 81 made of elastic material is provided between the case body 76 and the right side panel 78 over the entire periphery of the joint surface where the case body 76 and the right side panel 78 are joined together.

The rear side panel 79 is a rectangular panel. The rear side panel 79 is joined to a rear end of the case body 76 using bolts 84. A seal member 83 made of elastic material is provided between the case body 76 and the rear side panel 79 over the entire periphery of the surface where the case body 76 and the rear side panel 79 are joined together. It should be noted that the rear side panel 79 may not be a component part separately provided from the case body 76. The rear side panel 79 may be a component part which is provided integrally with the case body 76.

As shown in FIG. 1, the auxiliary device case 15 is a protection case for protecting fuel cell auxiliary devices 70. The auxiliary device case 15 is positioned adjacent to the main case 14 in the horizontal direction, and joined to the main case 14. The auxiliary device case 15 contains oxygen-containing gas system devices 70A and fuel gas system devices 70B as the fuel cell auxiliary devices 70.

The oxygen-containing gas system devices 70A placed in the auxiliary device case 15 are an air pump 71, a humidifier 73, etc. Fuel gas system devices 70B placed in the auxiliary device case 15 are an injector 74, an ejector 75, a hydrogen pump 77, valves (not shown), etc.

The auxiliary device case 15 included a recessed first case member 88 provided adjacent to the main case 14, and a recessed second case member 90 joined to the first case member 88. At least some of the fuel cell auxiliary devices 70 are placed in the first case member 88.

As shown in FIG. 5, the first case member 88 is provided between the main case 14 and the second case member 90. The first case member 88 is joined to the left end of the case body 76 using bolts 84. A seal member 79s made of elastic material is provided between the case body 76 and the first case member 88, over the entire periphery of the joint surface where the case body 76 and the first case member 88 are joined together. Therefore, a hermetical seal is formed between the case body 76 and the first case member 88.

The first case member 88 includes an end plate section 88a for applying a tightening load in the stacking direction to the fuel cell stack 12. The end plate section 88a is a bottom wall of the recessed first case member 88. That is, part of the first case member 88 also serves as another end plate 68B which applies a tightening load in the stacking direction to the cell stack body 12st. For example, the first case member 88 is formed by casting.

The first case member 88 includes the above end plate section 88a joined to the main case 14, and a surrounding wall (first surrounding wall) 88b extending from the entire periphery of the marginal portion of the end plate section 88a in the thickness direction of the end plate section 88a (in a direction away from the main case 14) (indicated by an arrow BL). The end plate section 88a and the surrounding wall 88b are not separate component parts that are joined together, and form the first case member 88 as a continuous one-piece component part. Alternately, the end plate section 88a and the surrounding wall 88b may be component parts that are produced separately (components parts that can be distinguished from each other, and the end plate section 88a and the surrounding wall 88b produced as such separate component parts may be joined together to form the first case member 88.

The end plate section 88a of the first case member 88 divides the internal space of the main case 14 and the internal space of the auxiliary device case 15. A first flange 88c is provided at the protruding end of the surrounding wall 88b (end adjacent to the second case member 90). The first flange 88c protrudes outward.

A plurality of ventilation holes 94 are provided in an upper part of the end plate section 88a. The ventilation holes 94 connect the internal space of the main case 14 and the internal space of the auxiliary device case 15 together. The ventilation holes 94 are holes penetrating through the end plate section 88a in the thickness direction indicated by an arrow B. The ventilation holes 94 face the left opening 76a of the case body 76. The above seal member 79s is provided outside the ventilation holes 94.

Piping openings 96a, 96b are formed in the end plate section 88a of the first case member 88. Connection pipes (not shown) connected respectively to the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b provided in the fuel cell stack 12 are inserted into the piping openings 96a, 96b.

The second case member 90 is a cover member which closes the first case member 88. The second case member 90 is joined to the first case member 88 using bolts 84. The second case member 90 has a shape recessed in a direction away from the fuel cell stack 12 (indicated by the arrow BL).

A second flange 90c is provided at the protruding end of a surrounding wall 90b (end adjacent to the first case member 88). The second case member 90 is joined to the first case member 88 using bolts 84. A seal member 93 made of elastic material is provided between the first flange 88c of the first case member 88 and the second flange 90c of the second case member 90 over the entire periphery of the joint surface where the first case member 88 and the second case member 90 are joined together. In the structure, a hermetical seal is formed between the first flange 88c and the second flange 90c.

Holes 15h are formed at two corners of the upper part of the auxiliary device case 15 (in the illustrated embodiment, formed on an upper surface 72s of the auxiliary device case 15 in the vertical direction), opposite to a side of the auxiliary device case 15 to which where the main case 14 is joined. The auxiliary device case 15 is in fluid communication with the outside through the holes 15h. Specifically, the holes 15h are formed at two corners of the upper part of the second case member 90. The hole 15h may be formed only at one of the two corners of the upper part of the second case member 90. The holes 15h may be formed on the upper part of the side surfaces, instead of the upper surface 72s of the second case member 90 in the vertical direction.

In order to ventilate the internal space of the main case 14 by supplying the air into the main case 14 from the outside, ventilation air inlet holes 99 are formed in the main case 14. A plurality of the ventilation air inlet holes 99 are formed in the lower part of the main case 14 (in the illustrated embodiment, the lower part of the right side panel 78 and the lower part of the rear side panel 79). Further, the ventilation air inlet holes 99 are formed in the lower part of the auxiliary device case 15 (in the illustrated embodiment, the lower part of the first case member 88 and the lower part of the second case member 90).

Figure 6:
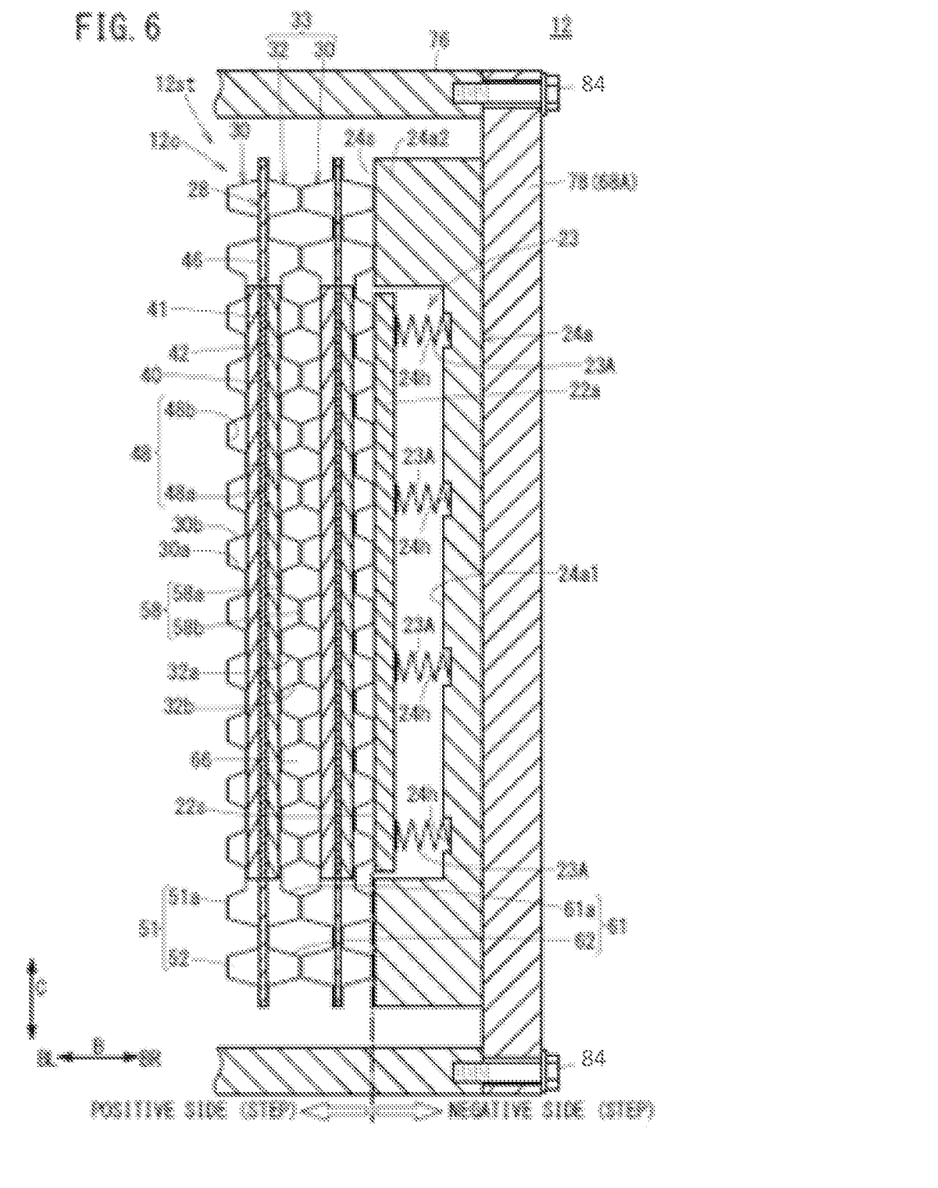
FIG. 6 is a cross sectional view showing a fuel cell stack.

As shown in FIG. 6, elastic structure 23 for elastically pressing the terminal plate 22a toward the cell stack body 12st is provided between the insulator 24a and the terminal plates 22a. The insulator 24a and the terminal plate 22a are provided between an end of the cell stack body 12st on one side in the stacking direction (in the direction indicated by the arrow BR) and the end plate 68A (right side panel 78). A dummy cell which does not perform power generation may be provided on one side of the cell stack body 12st in the stacking direction.

The insulator 24a is made of electrically insulating material. The insulator 24a is a plate member having the thickness in the stacking direction. The insulator 24a is held between the cell stack body 12st and the end plate 68A, and applies a tightening load in the stacking direction to the cell stack body 12st. The position of the insulator 24a relative to the end plate 68A in the stacking direction is fixed. That is, the insulator 24a is not displaceable in the stacking direction relative to the end plate 68A.

The insulator 24a includes a recess 24a1 recessed in a direction away from the cell stack body 12st (in the direction indicated by the arrow BR), and a frame shaped outer peripheral portion 24a2 which surrounds the recess 24a1, and protrudes toward the cell stack body 12st from the recess 24a1. The terminal plate 22a and the elastic structure 23 are provided in the recess 24a1. The depth of the recess 24a1 (size in the direction indicated by the arrow B) is larger than the thickness of the terminal plate 22a. As viewed in the stacking direction, each of the recess 24a1 and the terminal plate 22a has a substantially rectangular shape. As viewed in the stacking direction, the frame shaped outer peripheral portion 24a2 is formed in a substantially rectangular shape surrounding the recess 24a1.

As viewed in the stacking direction, the frame shaped outer peripheral portion 24a2 of the insulator 24a is provided at a position overlapped with the seal between the insulator 24a and the power generation cell 12c. At one end of the cell stack body 12st in the stacking direction, the frame shaped outer peripheral portion 24a2 presses the outer peripheral portion of the power generation cell 12c over the entire periphery. The frame shaped outer peripheral portion 24a2 presses part of the cell stack body 12st outside the position overlapped with the membrane electrode assembly 28a in the stacking direction. Therefore, the frame shaped outer peripheral portion 24a2 does not press the position of the cell stack body 12st overlapped with the membrane electrode assembly 28a in the stacking direction.

The terminal plate 22a has a surface size corresponding to the electrode part (the cathode 41 and the anode 42) as a power generation area of the power generation cell 12c. At least part of the terminal plate 22a in the thickness direction is inserted into the recess 24a1. The thickness of the terminal plate 22a is smaller than the depth of the recess 24a1. The terminal plate 22a is displaceable in the stacking direction along the inner peripheral surface of the recess 24a1 as a guide. Therefore, the terminal plate 22a is displaceable in the stacking direction relative to the end plate 68A and the insulator 24a. The surface of the terminal plate 22a opposite to the cell stack body 12st faces the bottom surface of the recess 24a1 through a gap.

As viewed in the stacking direction, the terminal plate 22a is provided at a position overlapped with the membrane electrode assembly 28a inside the seal (the first seal line 51 and the second seal line 61). At one end of the cell stack body 12st in the stacking direction, the terminal plate 22a presses a portion of the power generation cell 12c inside the outer peripheral portion of the power generation cell 12c. Therefore, the terminal plate 22a applies the tightening load in the stacking direction to the electrode part (electrode reaction surface) as a power generation area of the power generation cell 12c.

In the embodiment of the present invention, the elastic structure 23 includes a plurality of coil springs 23A. The plurality of coil springs 23A are provided at intervals in the elastically compressed state, between the terminal plate 22a and the insulator 24a. A plurality of the coil springs 23A are provided in each of the horizontal direction and the vertical direction. A plurality of holders 24h for holding (fixing) one end of each of the coil springs 23A are provided on the bottom surface of the recess 24a1. Each of the holders 24h is in the form of a groove which can be engaged with the outer circumference of the coil spring 23A. Each of the holders 24h may be a projection inserted into the inner circumference at one end of each of the coil springs 23A. The plurality of holders 24h may be provided on a surface of the terminal plate 22a facing the bottom surface of the recess 24a1.

The elastic structure 23 may have at least one disc spring, instead of the coil spring 23A. The elastic structure 23 may include an elastic porous material or a rubber, instead of the coil spring 23A. The elastic structure 23 may be created by combining at least two of the coil spring 23A, the disc spring, the porous material, and the rubber. The plurality of coil springs 23A are arranged in a manner that the load distribution becomes uniform in the surface, toward the terminal plate 22a.

Most preferably, a surface of the terminal plate 22a adjacent to the cell stack body 12st (hereinafter referred to as the "terminal surface 22s") matches with a surface of the frame shaped outer peripheral portion 24a2 adjacent to the cell stack body 12st (hereafter referred to as an "insulator surface 24s") in respect of the position in the stacking direction. However, a step or positional difference having a size of not more than an allowable value may be present between the terminal surface 22s and the insulator surface 24s (hereinafter this step will be referred as the "inter terminal/insulator step"). If the size of the inter terminal/insulator step exceeds the allowable value, an unallowable deformation may occur in the separator. Therefore, the spring constant K of the elastic structure 23 is determined within the operating temperature range of the fuel cell stack 12 in a manner that the size of the inter terminal/insulator step does not exceed the allowable value.

In the following description, with respect to the inter terminal/insulator step, the case where the terminal surface 22s is displaced toward the cell stack body 12st (in the direction indicated by the arrow BL), from the insulator surface 24s will be defined as the step on the positive (+) side, and the case where the terminal surface 22s is displaced toward the end plate 68A (in the direction indicated by the arrow BR), from the insulator surface 24s will be defined as the step on the negative (−) side.

Figure 7:
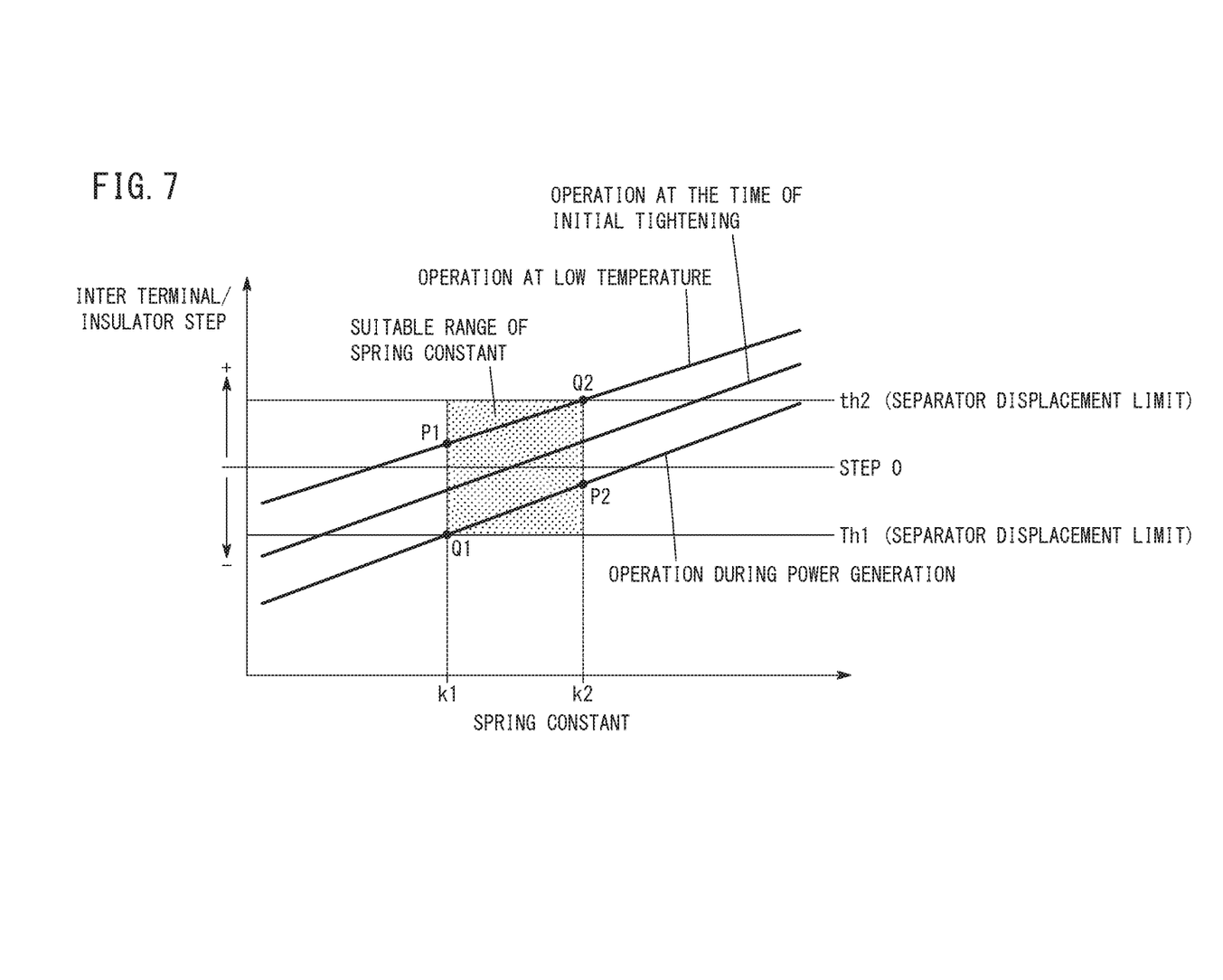
FIG. 7 is a graph illustrating a setting range of a spring constant of elastic structure.

The spring constant K of the elastic structure 23 is determined to be within a suitable range shown in FIG. 7. The rigidity of the cell stack body 12st changes depending on the temperature. Therefore, in correspondence with this change, the spring constant K of the elastic structure 23 needs to be high as the temperature increases (P2 of FIG. 7), and spring constant K of the spring constant K needs to be low as the temperature decreases (P1 of FIG. 7).

The operating temperature of the fuel cell stack 12 (cell stack body 12st) during power generation (during power generation in the rated condition) is higher than that at the time of initially tightening the components of the fuel cell stack 12 (at the time of assembling the fuel cell stack 12). If the spring constant K is too small, the displacement amount (deformation amount) of the separators (the first metal separator 30 and a second metal separator 20) and the MEA 28a becomes large during power generation. In this regard, the spring constant K of the elastic structure 23 is determined in a manner that the inter terminal/insulator step does not go to the negative (−) side beyond the threshold value th1 (separator displacement limit) during power generation. Therefore, the spring constant K indicating that the inter terminal/insulator step has the threshold value th1 (Q1) during power generation is the lower limit value k1 of the spring constant K.

On the other hand, in the case of starting operation of the fuel cell stack 12 at the low ambient temperature, e.g., in winter season (in the case of starting operation of the fuel cell stack 12 at low temperature), the operating temperature of the fuel cell stack 12 is low in comparison with the operating temperature of the fuel cell stack 12 at the time of initially tightening the components of the fuel cell stack 12. If the spring constant K is too large, the deformation amount (displacement amount) at low temperature becomes too large. In an attempt to address this problem, the spring constant K of the elastic structure 23 is determined in a manner that, at low temperature, the inter terminal/insulator step does not go to the positive side beyond a threshold value th2 (separator displacement limit). Therefore, the spring constant K indicating that the inter terminal/insulator step at low temperature has the threshold value th2 (Q2) is an upper limit value k2 of the spring constant K. In view of the above, preferably, the spring constant K of the elastic structure 23 is determined to be not less than k1, and not more than k2. The elastic structure 23 may be provided between the terminal plate 22b and the insulator 24b on the opposite side.

In FIG. 1, the distance between the pair of end plates 68A, 68B joined to both ends of the case body 76 is constant, and the cell stack body 12st, the pair of terminal plates 22a, 22b and the pair of insulators 24a, 24b are provided between the pair of end plates 68A, 68B. Therefore, the distance between the pair of insulators 24a, 24b provided at both ends of the cell stack body 12st in the stacking direction is constant, and the size in the stacking direction of the outer peripheral portion (seal area) of the cell stack body 12st held between the insulators 24a, 24b is kept constant. Instead of the case body 76, a flat plate or a stud bolt may be provided between the sides of the end plates 68A, 68B.

The fuel cell system 10 further includes an exhaust gas device 98 for discharging the fuel gas from the stack case 13 (the main case 14 and the auxiliary device case 15). In the case where the fuel gas is leaked from the cell stack body 12st or the fuel cell auxiliary devices 70 (fuel gas system devices 70B and oxygen-containing gas system devices 70A), the fuel gas is discharged to the outside of the vehicle through the exhaust gas device 98. The exhaust gas device 98 includes a first ventilation duct 100a connected to the main case 14, and a second ventilation duct 100b connected to the auxiliary device case 15.

The first ventilation duct 100a includes two connection pipes 102a, 102b connected to the two holes 14h of the main case 14, and a merge pipe 102c. The two connection pipes 102a, 102b are merged into the merge pipe 102c. The merge pipe 102c is connected to a right exhaust port 110R provided at a right fender 108R. The second ventilation duct 100b includes two connection pipes 104a, 104b connected to the two holes 15h of the auxiliary device case 15, and a merge pipe 104c. The two connection pipes 104a, 104b are merged into the merge pipe 104c. The merge pipe 104c is connected to a left exhaust port 110L provided at a left fender 108L. The first ventilation duct 100a and the second ventilation duct 100b are connected together through a coupling pipe 112.

Next, operation of the fuel cell stack 12 having the above structure will be described.

As shown in FIG. 2, an oxygen-containing gas such as the air is supplied to the oxygen-containing gas supply passage 34a. A fuel gas such as the hydrogen-containing gas is supplied to the fuel gas supply passage 38a. Pure water, ethylene glycol, or oil is supplied to the coolant supply passages 36a.

As shown in FIG. 3, the oxygen-containing gas flows from the oxygen-containing gas supply passage 34a into the oxygen-containing gas flow field 48 of the first metal separator 30 through the bridge section 80 and the inlet buffer 50A. Then, as shown in FIGS. 2 and 3, the oxygen-containing gas flows along the oxygen-containing gas flow field 48 in the direction indicated by the arrow A, and the oxygen-containing gas is supplied to the cathode 41 of the membrane electrode assembly 28a.

In the meanwhile, as shown in FIG. 4, the fuel gas flows from the fuel gas supply passage 38a into the fuel gas flow field 58 of the second metal separator 32 through the bridge section 91 and the inlet buffer 60A. Then, as shown in FIGS. 2 and 4, the fuel gas flows along the fuel gas flow field 58 in the direction indicated by the arrow A, and the fuel gas is supplied to the anode 42 of the membrane electrode assembly 28a.

Thus, in each of the membrane electrode assemblies 28a, the oxygen-containing gas supplied to the cathode 41 and the fuel gas supplied to the anode 42 are consumed in the electrode chemical reactions in the first electrode catalyst layer and the second electrode catalyst layer to generate electricity.

Then, as shown in FIG. 3, the oxygen-containing gas supplied to the cathode 41 is consumed at the cathode 41, and the oxygen-containing gas flows from the oxygen-containing gas flow field 48 into the oxygen-containing gas discharge passage 34b through the bridge section 82. Then, as shown in FIG. 2, the oxygen-containing gas is discharged in the direction indicated by the arrow B along the oxygen-containing gas discharge passage 34b. Likewise, as shown in FIG. 4, the fuel gas supplied to the anode 42 is consumed at the anode 42, and the fuel gas flows from the fuel gas flow field 58 into the fuel gas discharge passage 38b through the bridge section 92. Then, as shown in FIG. 2, the fuel gas is discharged in the direction indicated by the arrow B along the fuel gas discharge passage 38b.

Further, the coolant supplied to the coolant supply passage 36a flows into the coolant flow field 66 formed between the first metal separator 30 and the second metal separator 32 that are joined together, and then, the coolant flows in the direction indicated by the arrow A. After the coolant cools the membrane electrode assembly 28a, the coolant is discharged from the coolant discharge passage 36b.

The fuel cell stack 12 according to the embodiment of the present invention offers the following advantages.

In the fuel cell stack 12, as shown in FIG. 6, the elastic structure 23 is provided between the insulator 24a and the terminal plate 22a. Therefore, it becomes possible to absorb the size changes in the stacking direction of the electrode part (the cathode 41 and the anode 42) of the membrane electrode assembly 28a in the cell stack body 12st, and suppress the load changes in the electrode part effectively.

The insulator 24a includes the recess 24a1 recessed in a direction away from the cell stack body 12st. The terminal plate 22a and the elastic structure 23 are provided in the recess 24a1. In the structure, since the thickness of the insulator 24a is utilized to provide the terminal plate 22a and the elastic structure 23, it is possible to minimize the increase in the size in the stacking direction, even though the elastic structure 23 is provided.

The terminal plate 22a has the surface size corresponding to the electrode part (the cathode 41 and the anode 42) as the power generation area of the power generation cell 12c. In the structure, it is possible to effectively suppress the load changes in the electrode part of the membrane electrode assembly 28a to a greater extent.

On one surface of the separator (the first metal separator 30, the second metal separator 32), the reactant gas flow field (the oxygen-containing gas flow field 48, the fuel gas flow field 58) as a passage of the reactant gas along the membrane electrode assembly 28a, and the ridge shaped seal (the first seal line 51, the second seal line 61) for preventing fluid leakage formed around the reactant gas flow field are provided. The insulator 24a includes the frame shaped outer peripheral portion 24a2 which surrounds the recess 24a1, and protrudes from the recess 24a1 toward the cell stack body 12st. As viewed in the stacking direction, the frame shaped outer peripheral portion 24a2 of the insulator 24a is provided at a position overlapped with the seal, and the terminal plate 22a is disposed at the position overlapped with the membrane electrode assembly 28a inside the seal. In the structure, since the terminal plate 22a does not apply the load to the seal of the cell stack body 12st, it is possible to maintain the size of the seal of the cell stack body 12st in the stacking direction (while achieving a certain seal surface pressure), and suppress the load changes in the electrode part of the membrane electrode assembly 28a.

In the above embodiment, in FIG. 1, the fuel cell system 10 is mounted in the fuel cell vehicle 11 in a manner that the stacking direction of the fuel cell stack 12 is oriented in the vehicle width direction (indicated by the arrow B). Alternatively, the fuel cell system 10 may be mounted in the fuel cell vehicle 11 in a manner that the stacking direction of the fuel cell stack 12 is oriented in the vehicle front-rear direction (indicated by the arrow A). In the embodiment of the present invention, the fuel cell system 10 is mounted in the fuel cell vehicle 11 in a manner that the main case 14 is provided on the right side, and the auxiliary device case 15 is provided on the left side. Alternatively, the fuel cell system 10 may be provided in the fuel cell vehicle 11 in a manner that the main case 14 is provided on the left side and the auxiliary device case 15 is provided on the right side.

The present invention is not limited to the above described embodiment. Various modifications can be made without departing from the gist of the present invention.

What is claimed is:

1. A fuel cell stack comprising:
   a cell stack body including a plurality of stacked power generation cells, the power generation cells each including a membrane electrode assembly and a separator;
   a terminal plate and an insulator disposed at an end of the cell stack body in a stacking direction; and
   a stack case containing the cell stack body,
   wherein the terminal plate is disposed between the cell stack body and the insulator; and
   a load in the stacking direction is applied to the cell stack body, the terminal plate, and the insulator, and
   wherein the stack case includes a case body surrounding the cell stack body and a pair of end plates joined to both ends of the case body,
   the cell stack body, a pair of the terminal plates, and a pair of the insulators are held between the pair of end plates,
   at least one of the pair of end plates is joined to the case body using a bolt,
   the insulator includes a recess recessed in a direction away from the cell stack body, and a frame shaped outer peripheral portion surrounding the recess and protruding from the recess toward the cell stack body,
   wherein elastic structure elastically pressing the terminal plate in a direction from the insulator toward the cell stack body is sandwiched between the insulator and the terminal plate, at one end of the cell stack body in the stacking direction, the terminal plate, the elastic structure, the insulator are provided in this order in the stacking direction from the cell stack body, and wherein at one end of the cell stack body in the stacking direction, the frame shaped outer peripheral portion is configured to press an outer peripheral portion of the power generation cell by the at least one of the pair of end plates joined to the case body using the bolt.

2. The fuel cell stack according to claim 1,
the terminal plate and the elastic structure are disposed in the recess of the insulator.

3. The fuel cell stack according to claim 1, wherein the terminal plate has a surface size corresponding to an electrode part as a power generation area of the power generation cell.

4. The fuel cell stack according to claim 2, wherein on one surface of the separator, a reactant gas flow field as a passage of a reactant gas along the membrane electrode assembly and a ridge shaped seal formed around the reactant gas flow field are provided, the ridge shaped seal configured to prevent leakage of fluid;

as viewed in the stacking direction, the frame shaped outer peripheral portion of the insulator is disposed at a position overlapped with the seal; and the terminal plate is disposed at a position overlapped with the membrane electrode assembly inside the seal.

5. The fuel cell stack according to claim 2, wherein
at one end of the cell stack body in the stacking direction, the terminal plate is configured to press a portion of the power generation cell inside the outer peripheral portion of the power generation cell.

6. The fuel cell stack according to claim 1, wherein a distance between a pair of the insulators provided at both ends of the cell stack body in the stacking direction is constant.

7. The fuel cell stack according to claim 1, wherein the elastic structure comprises a coil spring, a disc spring, an elastic porous material, or a rubber.

8. The fuel cell stack according to claim 4, wherein, in an operating temperature range of the fuel cell stack, a step between a surface of the terminal plate adjacent to the cell stack body and a surface of the frame shaped outer peripheral portion adjacent to the cell stack body is determined to have a size of not more than an allowable value.

9. The fuel cell stack according to claim 1, wherein the terminal plate is displaceable in the stacking direction relative to the end plate and the insulator.

10. The fuel cell stack according to claim 1, wherein
the frame shaped outer peripheral portion contacts the outer peripheral portion of the power generation cell adjacent to the insulator;
the terminal plate and the elastic structure are disposed in the recess; and
one surface of the terminal plate is configured to contact the cell stack body, and another surface of the terminal plate is configured to contact the elastic structure.

11. The fuel cell stack according to claim 10, wherein the terminal plate is configured to press a position of the cell stack body overlapped with the membrane electrode assembly in the stacking direction; and
the frame shaped outer peripheral portion is configured not to press the position of the cell stack body overlapped with the membrane electrode assembly in the stacking direction.

* * * * *